United States Patent
Cerchio et al.

(10) Patent No.: US 10,206,068 B2
(45) Date of Patent: Feb. 12, 2019

(54) SYSTEMS AND METHODS TO DETERMINE A LOCATION OF A MOBILE DEVICE

(71) Applicant: OneMarket Network LLC, San Francisco, CA (US)

(72) Inventors: Gerard Joseph Cerchio, San Francisco, CA (US); Brian David Wilson, Fountain Hills, AZ (US)

(73) Assignee: OneMarket Network LLC, San Francisco, CA (US)

( * ) Notice: Subject to any disclaimer, the term of this patent is extended or adjusted under 35 U.S.C. 154(b) by 0 days.

(21) Appl. No.: 15/193,377

(22) Filed: Jun. 27, 2016

(65) Prior Publication Data

US 2017/0013409 A1    Jan. 12, 2017

Related U.S. Application Data (60) Provisional application No. 62/190,690, filed on Jul. 9, 2015, provisional application No. 62/192,795, filed on Jul. 15, 2015.

(51) Int. Cl.
*H04W 4/02*   (2018.01)
*G01C 21/20*  (2006.01)
*H04W 4/04*   (2009.01)
*H04W 72/04*  (2009.01)
*G01C 25/00*  (2006.01)
*H04W 4/029*  (2018.01)
*G01S 5/02*   (2010.01)

(52) U.S. Cl.
CPC .......... *H04W 4/025* (2013.01); *G01C 21/206* (2013.01); *G01C 25/005* (2013.01); *G01S 5/0263* (2013.01); *H04W 4/029* (2018.02); *H04W 4/043* (2013.01); *H04W 72/0473* (2013.01); *G01S 5/0252* (2013.01)

(58) Field of Classification Search
CPC ..... H04W 4/028; H04W 4/043; H04W 4/025; H04W 72/0473; G01C 25/005; G01C 21/206; G01S 5/0263; G01S 5/0252
See application file for complete search history.

(56) References Cited

U.S. PATENT DOCUMENTS

| | | |
|---|---|---|
| 8,179,816 B1 | 5/2012 | Vaidyanathan et al. |
| 8,781,502 B1 | 7/2014 | Middleton et al. |

(Continued)

FOREIGN PATENT DOCUMENTS

| | | |
|---|---|---|
| WO | 2014065540 | 5/2014 |
| WO | 2015049660 | 4/2015 |

OTHER PUBLICATIONS

European Patent Application No. 16177365.0, Search Report, dated Dec. 7, 2016.

*Primary Examiner* — Nathan Mitchell
(74) *Attorney, Agent, or Firm* — Kwan & Olynick LLP (57) ABSTRACT

Systems and methods to position beacons at traffic choke points, use a mobile device to detect the peaks of beacon signals corresponding to the mobile device traveling through the traffic "choke points", and thus determine accurately the position and speed of the mobile device in the transport corridor between the choke points. The determined position and speed of the mobile device can be used to improve the performance of other location determination technologies, such as radio frequency fingerprint-based location estimate and/or inertial guidance location estimate.

11 Claims, 3 Drawing Sheets

(56) References Cited

U.S. PATENT DOCUMENTS

| | | |
|---|---|---|
| 9,204,257 B1 | 12/2015 | Mendelson |
| 2002/0198656 A1 | 12/2002 | Ford et al. |
| 2005/0097005 A1 | 5/2005 | Fargo |
| 2007/0168127 A1* | 7/2007 | Zaruba .................. A61B 5/053 |
| | | 701/500 |
| 2009/0149992 A1 | 6/2009 | Ohno |
| 2009/0265251 A1 | 10/2009 | Dunlap et al. |
| 2010/0094463 A1 | 4/2010 | Okabayashi et al. |
| 2011/0117924 A1* | 5/2011 | Brunner ............... G01S 5/0252 |
| | | 455/456.1 |
| 2012/0087212 A1 | 4/2012 | Vartanian et al. |
| 2012/0173139 A1 | 7/2012 | Judd et al. |
| 2012/0226467 A1 | 9/2012 | Miller et al. |
| 2013/0342391 A1* | 12/2013 | Hoang .................... G01S 19/47 |
| | | 342/357.3 |
| 2014/0142846 A1* | 5/2014 | Chun ................... G01S 5/0072 |
| | | 701/519 |
| 2014/0222573 A1 | 8/2014 | Middleton et al. |
| 2014/0222685 A1 | 8/2014 | Middleton et al. |
| 2015/0149133 A1* | 5/2015 | Do ....................... G01C 21/206 |
| | | 703/6 |
| 2015/0271641 A1 | 9/2015 | Sung |
| 2015/0281910 A1* | 10/2015 | Choudhury ............. G01S 5/021 |
| | | 455/456.1 |
| 2016/0050541 A1* | 2/2016 | Youssef ................ H04W 4/043 |
| | | 370/338 |
| 2017/0078849 A1* | 3/2017 | Li ......................... H04W 4/025 |
| 2017/0366944 A1* | 12/2017 | Geng ..................... H04W 4/008 |

\* cited by examiner

SYSTEMS AND METHODS TO DETERMINE A LOCATION OF A MOBILE DEVICE

RELATED APPLICATIONS

The present application claims the benefit of the filing dates of: Prov. U.S. Pat. App. Ser. No. 62/190,690, filed Jul. 9, 2015, and Prov. U.S. Pat. App. Ser. No. 62/192,795, filed Jul. 15, 2015, both entitled "SYSTEMS AND METHODS TO DETERMINE A LOCATION OF A MOBILE DEVICE", the entire disclosures of which applications are hereby incorporated herein by reference.

FIELD OF THE TECHNOLOGY

At least some embodiments of the present disclosure relate to position determination systems in general and more particularly but not limited to the determination of a position of a mobile device using beacon devices that transmit wireless signals.

BACKGROUND

U.S. Pat. No. 8,179,816 discloses an indoor positioning system using a narrowband radio frequency transceiver and discussed a number of other indoor positioning systems. For example, some systems use power-of-arrival (PoA) from a set access points in accordance with IEEE 802.11 for wireless local area networks to determine the location of a mobile device. For example, some systems use Time-of-flight (ToF) of signals from or to satellites or base-stations to convert the arrival time to distances in view of the propagation speed of signals.

U.S. Pat. App. Pub. No. 2012/0226467 discloses an inertial navigation unit that utilizes multiple accelerometers to gather specific force data for improvement of the initialization, navigation, assistance, or corrective processes.

U.S. Pat. App. Pub. No. 2002/0198656 discloses an Inertial GPS navigation system that has a GPS sub-system and an inertial sub-system. If the receiver loses GPS satellite signals, the receiver utilizes the inertial position, velocity and covariance information to speed up GPS satellite signal re-acquisition and associated ambiguity resolution operations.

U.S. Pat. App. Pub. No. 2012/0173139 discloses the use of magnetic fingerprint of locations to estimate the position of a navigation device.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In one embodiment, a system is configured to provide improved position determination results by distributing beacon devices at pedestrian traffic "choke points", such as door entrances, elevator entrances and tops and bottoms of escalators, to obtain a very precise position of the mobile device based on the radio frequency power measurement of the beacon devices positioned at these choke points. The results can be used to correct the positions of the mobile device determined using other technologies, such as providing an initial position to be used by an inertial navigation system to track the location of the mobile device, correcting the drift in the tracked location provided by the inertial navigation system, imprecision of Wi-Fi and beacon fingerprinting, and/or providing a much more accurate and robust positioning method.

Figure 1:
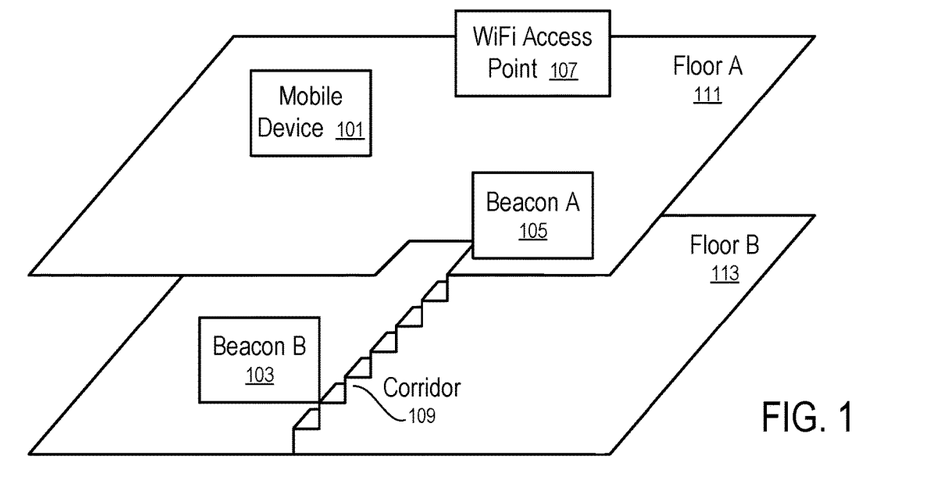
FIG. 1 shows a system configured to determine a position of a mobile device in an indoor environment according to one embodiment.

FIG. 1 shows a system configured to determine a position of a mobile device in an indoor environment according to one embodiment. For example, the system of FIG. 1 can be used to improve position determination results by distributing beacon devices at pedestrian traffic "choke points" as discussed above.

In FIG. 1, the position of the mobile device (101) in a multi-floor indoor environment is determined and/or tracked via the use of beacons (103 and 105) disposed at selected locations of a transport corridor (109), such as the top and bottom of an escalator or a stairway, the entrances of an elevator connecting between the floors (111 and 113), etc.

In FIG. 1, the direction of the location of one beacon B (103) to the location of another beacon A (105) corresponds to the direction of traffic flow on the corridor (109). The transport corridor (109) substantially confines the possible locations of the mobile device (101) on one or more pre-defined line segments identified by the locations of the beacons (103, 105), if the mobile device (101) is determined to be in the traffic on the corridor (109). Thus, detecting the mobile device (101) being in the traffic simplifies the position determination of the mobile device (101) and improves the accuracy of the determined position.

In FIG. 1, the mobile device (101) is configured to receive signals from the beacons (103 and 105) and monitor the signal strength of the received beacon signals. When the mobile device (101) moves past a beacon (e.g., 105), the strength of the signal received from the beacon (105) reaches a peak and then drops off from the peak. The time instance at which the beacon signal reaches the peak corresponds to the moment where the mobile device (101) is the closest to the location of the beacon (105).

In general, the mobile device (101) may move close to the beacon (105) and then move away from the beacon (105), causing the mobile device (101) to detect a peak in beacon signal, without actually moving to the location of the beacon (105).

When the mobile device (101) detects that a peak in signal strength from the beacon A (105) and then a peak in signal strength from the beacon B (103), the mobile device (101) determines that the movement of the mobile device (101) is consistent with the traffic flow in the transport corridor (109).

Furthermore, the time gap between the peak in signal strength from the beacon A (105) and the peak in signal strength from the beacon B (103) is determined to be the travel time from the vicinity of beacon A (105) to the vicinity of beacon B (103). The time gap can be compared with the time gap of expected traffic flowing through the transport corridor (109). If the time gaps match with each other, the determination of the mobile device (101) moving along the corridor (109) during the time period between the signal peaks can be confirmed. Thus, a location of the mobile device determined using another location determination system can be corrected and/or improved based on the timing of the mobile device traveling in the traffic flow; alternatively or in combination, the position of the mobile device determined in connection with the traffic flow can be used as an initial position of the mobile device in subsequent tracking of the position of the mobile device.

For example, when the corridor (109) is an escalator, the expected traffic flow can be determined based on the speed of the escalator. For example, when the corridor (109) is an elevator, the expected traffic flow can be determined from the speed of the elevator. For example, when the corridor (109) is a stairway, an average traffic flow speed can be measured for the stairway to determine a typical time gap for traveling from the vicinity of the beacon A (105) to the vicinity of the beacon B (103).

When the time gap between the peak in signal strength from the beacon A (105) and the peak in signal strength from the beacon B (103) is consistent with the expected traffic flowing through the transport corridor (109), the mobile device (101) is determined to have traveled between the locations of the beacon A (105) and the beacon B (103). Thus, the travel speed and position of the mobile device (101) during the time period between the peaks in beacon signal strength are determined in relation with the known path of the corridor (109) with great precision.

The determined position and the travel speed of the mobile device based on the beacons in connection with the information of the traffic flow can be used to augment the performance of other indoor positioning systems.

For example, in one embodiment, the mobile device (101) further includes an inertial guidance system that uses motion sensors, such as accelerometers and gyroscopes, to calculate, via dead reckoning, the position, orientation, and velocity (including the direction and speed of movement) of the mobile device (101). For example, the acceleration over a period of time provides the change in the speed of the mobile device (101); and the speed of the mobile device (101) over a period of time provides the change in the position of the mobile device (101).

The determined position and travel speed of the mobile device (101) on the corridor (109) can be used to provide an initial position and/or the speed for the inertial guidance system to determine, using the measurements from the motion sensors, the subsequent location and spend of the mobile device (101) after the mobile device moves away from the corridor (109).

For example, when the mobile device (101) moves to the next corridor (109), or travels back via the corridor (109), the determined position and travel speed of the mobile device (101) in the corridor (109) can be used to reset the position and/or the speed of the mobile device (101) for subsequent location tracking via the inertial guidance system. Thus, each time the mobile device (101) moves through a corridor (109) with the correspondingly equipped beacon sets (103 and 105), the mobile device (101) can reinitialize the inertial guidance system to correct drift in the results provided by the inertial guidance system.

When the corridor (109) is an elevator, a signal beacon (105) may be installed inside the elevator. When the mobile device (101) enters the elevator, the beacon signal strength reaches a highest level and stay at the level during the time period of the elevator traveling from one floor (113) to another floor (111). When the mobile device leaves the elevator, the beacon signal strength drops off from the highest level. Thus, from correlating the timing of the beacon signal strength reaching the highest level and dropping off from the highest level with the time of the travel of the elevator, the speed and position of the mobile device (101) within the elevator can be determined with great accuracy. The floor position of the elevator can be used to accurately identify the position of the elevator. Optionally, the beacon signal may include the data reporting the floor position of the elevator and/or location coordinates of the beacon, which data can be used in the mobile device (101) to determine the location and travel speed of the mobile device (101) for the time period in the elevator. Alternatively, multiple beacons (105, 103) can be placed at the exit locations of the elevator in a way similar to beacons being placed on or near an escalator or stairway to provide the beacon location and/or identity information.

The mobile device (101) may optionally include a radio frequency fingerprint-based location determination system. When the mobile device (101) has a radio frequency fingerprint-based location determination system, the beacon signals can be used to improve the location determination results of the radio frequency fingerprint-based location determination system. For example, a distribution of radio frequency fingerprints of the indoor environment can be obtained via a survey operation. Different locations inside the multi-floor environment generally have different radio frequency fingerprints and different relations with neighboring locations. Thus, when the mobile device (101) moves around the environment and measures the radio frequency fingerprints, the measured radio frequency fingerprints can be correlated with the predetermined distribution of radio frequency fingerprints to determine a location of the mobile device (101).

However, in certain environments, different floors may have similar distribution of radio frequency fingerprints. Thus, the radio frequency fingerprint-based location determination system may have difficulties in determine accurately the floor on which the mobile device (101) is currently located. The determination of the mobile device (101) moving through the corridor (109) provides the accurate information about the floor on which the mobile device (101) is currently located and thus, allows the radio frequency fingerprint-based location determination system to correlate the measured radio frequency fingerprints with the distribution of the correct floor to provide accurate results with reduced correlation time.

When the mobile device (101) is equipped with multiple positioning systems, the mobile device (101) is configured to combine the results from the multiple positioning systems to provide an improved overall estimate of the position of the mobile device (101).

For example, when the mobile device (101) travels through the corridor (109), the accurate position and speed of the mobile device (101) can be used to provide the initial position and speed of the mobile device (101) for the inertial guidance system that uses the measurement of the motion sensors to updated the subsequent location and speed of the mobile device (101). After a period of time, the drift in the inertial guidance system may lead to increased errors in the determined location and speed of the mobile device (101). Thus, after a threshold period of time, if the inertial guidance system cannot be reset via the positioning results from traveling through a corridor equipped with the beacons (103, 105), the mobile device (101) may use the location results from the radio frequency fingerprint-based location determination system.

The accuracy of the results from the radio frequency fingerprint-based location determination system are associated with the locations calculated by matching the measured radio frequency fingerprints with the predetermined distribution of radio frequency fingerprints; and the accuracy of the results from the inertial guidance system are determined from the lapsed time from the initialization using an accurate result from the beacons (103, 105) installed near the corridor (109). The mobile device (101) combines the results from the radio frequency fingerprint-based location determination system and the inertial guidance system based on the accuracy estimates of the respective results. For example, when the result of the radio frequency fingerprint-based location determination system is more than a threshold better than the result of the inertial guidance system, the result from the inertial guidance system is discarded; when the result of the radio frequency fingerprint-based location determination system is more than a threshold worse than the result of the inertial guidance system, the result from the radio frequency fingerprint-based location determination system is discarded; and otherwise, the result of the radio frequency fingerprint-based location determination system and the result of the inertial guidance system are combined (e.g., via an weighted average, where the weights for the results from the different systems are proportional to the estimated accuracy of the respective results).

The mobile device (101) (or a remote server in communication with the mobile device (101)) is configured to remove and/or reduce the flaws of the individual measuring system (e.g., the inertial guidance system, the radio frequency fingerprint-based location determination system, and the choke-point-beacon-based system) by examining in real time the data of each individual system, using the known propensity of the types of errors that one system produces and the real time data produced by another system to eliminate the types of errors.

As an example, a radio frequency fingerprint-based location determination system has the propensity to report jumps in the position of the mobile device. The person may or may not be actually turning to the jump location. An inertial system does not report positions with this type of positioning errors. Therefore, when a jump signature is recognized in the reported positioning results of a radio frequency fingerprint-based location determination system, a solution integration engine, implemented in the mobile device (101) or a remote server in communication with the mobile device (101), is configured to eliminate the faulty position provided by the radio frequency fingerprint-based location determination system and utilizing the position determined by the inertial guidance system.

A typical inertial guidance system has a tendency to drift, which is recognized by the solution integration engine. Once a series of high quality positions has been received which have not had any recognized error artifact and the inertial system is exhibiting its drift tendency away from those high quality positions determined by the radio frequency fingerprint-based location determination system, the inertial system can be reset/initialized according to the positions determined by the radio frequency fingerprint-based location determination system, and/or creating a composite heading figure using the data from both systems.

Thus, the present disclosure provides a plurality of position correction techniques and system calibration techniques based on the known error signatures and tendencies of individual positioning systems used by the mobile device (or a remote server) and/or beacon signals associated with known locations and known traffic speed.

Figure 2:
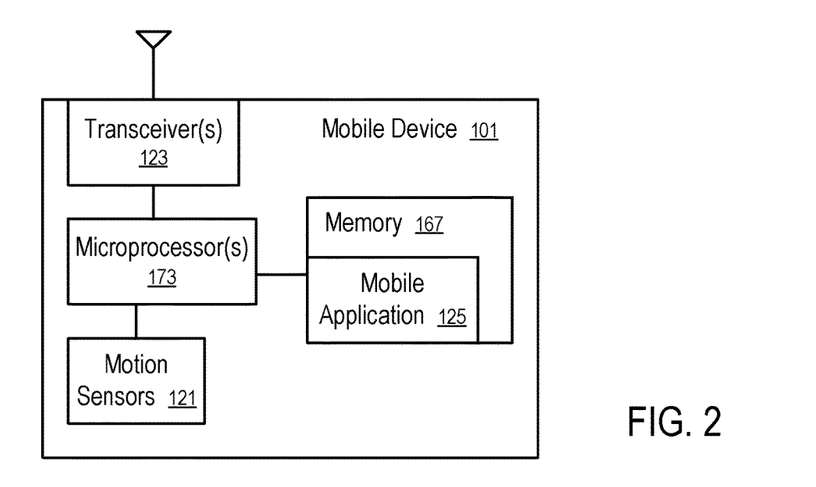
FIG. 2 shows a mobile device for its location determination according to one embodiment.

FIG. 2 shows a mobile device for its location determination according to one embodiment. For example, the mobile device (101) of FIG. 2 can be used in the system of FIG. 1. In FIG. 2, the mobile device (101) includes one or more transceivers (123) to receive signals from the beacons (103, 105) to detect the peaks of their signals corresponding to the travel of the mobile device (101) between the locations of the beacons.

Optionally, one or more transceivers (123) are further used to communicate with the Wi-Fi access points (e.g., 107) in the environment to support radio frequency fingerprint-based location estimation.

In FIG. 2, the mobile device (101) further includes motion sensors (121), such as accelerometers and gyroscopes to support inertial guidance based location estimation.

The mobile device (101) includes memory (167) storing a mobile application (125) having instructions configured to instruct one or more microprocessor(s) (173) to receive measurement results from the transceiver(s) (123) and the motion sensors (121), and determine the position of the mobile device (101) in a way as discussed above in connection with FIG. 1.

The memory (167) may optionally store data such as the distribution of radio frequency fingerprints in the indoor environment, the locations of beacons (103, 105), etc. Alternatively or in combination, the mobile device (101) communicates with a remote server to obtain such data (e.g., when such data is needed, or for storing in the memory (167) after the mobile device (101) enters the indoor environment as illustrated in FIG. 1).

Optionally, the beacons (103 and 105) broadcast not only their identities, but also related data, such as the location of the beacons (130 and 105), the expected travel speed of the corridor (109), etc. When such data is not included in the beacon signals, the mobile device (101) may look up such data from the memory (167) or query the remote server.

In the above discussion, the peak beacon signal strength is determined by the mobile device (101) receiving the beacon signals from the beacons (103, 105). Alternatively, the mobile device (101) may transmit the beacon signals to the corresponding beacons (103, 105), which are connected to a centralized remote server to compute the location of the mobile device (101). Similarly, the mobile device (101) may provide the radio frequency fingerprint measurements to the server for a determination of the location of the mobile device (101). Thus, the position calculations can be performed at least in part on the remote server.

Figure 3:
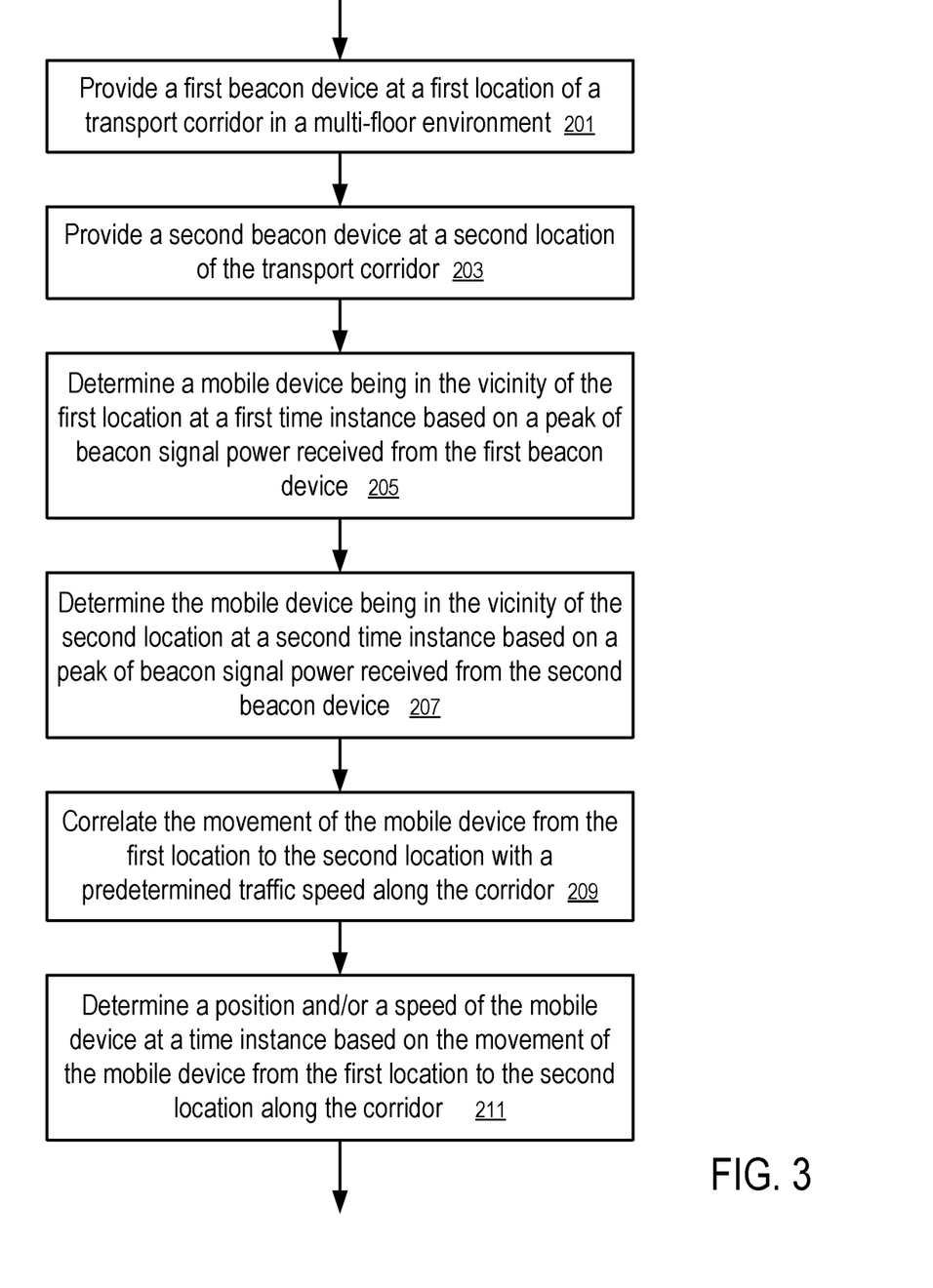
FIG. 3 shows a method to determine a location of a mobile device according to one embodiment.

FIG. 3 shows a method to determine a location of a mobile device according to one embodiment. The method of FIG. 3 can be implemented in the system of FIG. 1 using a mobile device (101) illustrated in FIG. 2.

In FIG. 3, the mobile device (101) is configured to: provide (201) a first beacon device at a first location of a transport corridor in a multi-floor environment; provide (203) a second beacon device at a second location of the transport corridor; determine (205) the mobile device being in the vicinity of the first location at a first time instance based on a peak of beacon signal power received from the first beacon device; determine (207) the mobile device being in the vicinity of the second location at a second time instance based on a peak of beacon signal power received from the second beacon device; correlate (209) the movement of the mobile device from the first location to the second location with a predetermined traffic speed along the corridor; and determine a position and/or (211) a speed of the mobile device at a time instance based on the movement of the mobile device from the first location to the second location along the corridor.

A method in the present disclosure includes: providing a first beacon device (103) at a first location of a transport corridor in a multi-floor environment; and providing a second beacon device (105) at a second location of the transport corridor (e.g., as illustrated in FIG. 1). After a mobile device (101) is determined to be at the first location at a first time instance based on a peak of beacon signal power from the first beacon device and at the second location at a second time instance based on a peak of beacon signal power from the second beacon device, the movement of the mobile device from the first location to the second location is correlated with a predetermined traffic speed along the corridor. The position and speed of the mobile device (101) at a time instance (e.g., between the first time instance and the second time instance) are determined based on the movement of the mobile device from the first location to the second location along the corridor, if the movement is consistent with predetermined traffic speed. Examples of the transport corridor include: a stairway, an escalator, an elevator, and a pathway or walkway having an entrance and an exit.

For example, based on the position and speed of the mobile device, an initial position and an initial speed used in an inertial guidance system of the mobile device can be calibrated, where the mobile device uses motion sensors to measure acceleration and rotation of the mobile device to track a current location of the mobile device from the initial position and the initial speed. For example, the position and speed of the mobile device determined from the movement of the mobile device in the corridor can be used as the initial position and the initial speed.

For example, the position of the mobile device can be used to improve a position determination result from a radio frequency fingerprint-based location determination system of the mobile device, where the mobile device measures a radio frequency fingerprint and determines a location of the mobile device based on correlation the radio frequency fingerprint with a predetermined distribution of radio frequency fingerprints in the multi-floor environment. For example, the position of the mobile device determined from the movement of the mobile device in the corridor can be used to select a floor from a plurality of floors in the multi-floor environment (e.g., to limit the correlation to the particular selected floor and/or prevent floor-jumping in the correlation).

Another method in the present disclosure includes: measuring, by a mobile device (101), a radio frequency fingerprint; correlating the radio frequency fingerprint to a predetermined distribution of radio frequency fingerprints in a multi-floor environment to determine a first location determination result; measuring, by the mobile device (101), accelerations of the mobile device as a function of time; determining a second location determination result based on the accelerations (e.g., via a time integration of the accelerations); receiving, in the mobile device, a first beacon signal from a beacon device (103) disposed at a first location of a transport corridor in the multi-floor environment; determining a first location of the beacon device (103) based on the first beacon signal; and computing a location of the mobile device (101) based on the first location of the beacon device, the first location determination result, and the second location determination result.

For example, after receiving in the mobile device (101), a second beacon signal from the beacon device, a second location of the beacon device can be determined based on the second beacon signal, where the location of the mobile device can be computed further based on the second location of the beacon device. For example, the beacon device may be disposed on a transport corridor in the form of an escalator or an elevator, where the beacon device travels with the escalator or elevator to transport the user who is carrying the mobile device (101). For example, a speed of the mobile device can be determined based on the first location and the second location of the beacon device; and the second location determination result can be determined based at least in part on the speed of the mobile device and a time integration of the accelerations. In some implementations, the first beacon signal identifies the first location of the beacon device; and the second beacon signal identifies the second location of the beacon device. In other implementations, the identifier(s) of the beacon(s) and/or the times of the beacon signals can be used to look up the beacon locations from a remoter server. Further, the beacon location can be used to select a floor in the first location determination result determined from radio frequency fingerprint correlation.

In another example, the mobile device receives the second beacon signal from a second beacon device (105) to determine the second location. Then, a speed of the mobile device (101) can be based on the first location of the first beacon device (103) and the second location of the second beacon device (105) that are located on different part of the transport corridor, such as a stairway, a pathway or walkway having an entrance and an exit, an escalator, an elevator, etc. The speed can be used as a basis from which time integration of accelerations can be used to track the subsequent locations of the mobile device (101) based on the measurement of the motion sensors.

A further method of the present disclosure includes: measuring, using at least one transceiver (123) of a mobile device (101), a radio frequency fingerprint; determining a first location determination result based on correlating the radio frequency fingerprint to a predetermined distribution of radio frequency fingerprints in a multi-floor environment; measuring, using a motion sensor (121) of the mobile device (101), accelerations of the mobile device as a function of time; determining a second location determination result based on the accelerations; and computing a location of the mobile device by combining the first location determination result and the second location determination result.

For example, after estimating an accuracy of the first location result and an accuracy of the second location result, the mobile device (101) (or a remote server in communication with the mobile device (101)) combines the first location determination result and the second location determination result based on the accuracy of the first location result and the accuracy of the second location result. The combination of the first location determination result and the second location determination result can be in the form of a weighted average of the first location determination result and the second location determination result, where weights of first location determination result and the second location determination result are based on the accuracy of the first location result and the accuracy of the second location result.

Further, the mobile device (101) may optionally receive at least two beacon signals from at least one beacon device (e.g., 103 and/or 105) disposed on a transport corridor in a multi-floor environment to determine at least two beacon positions corresponding to the at least two beacon signals. A position and a speed of the mobile device (101) on the transport corridor are estimated based on the at least two beacon positions and used in the computation of the location of the mobile device.

For example, the position and the speed of the mobile device (101) on the transport corridor estimated based on the at least two beacon positions can be used as an initial solution to time integrate accelerations measured by the motion sensor and track the location of the mobile device. Further, the position the mobile device on the transport corridor estimated based on the at least two beacon positions can be used to identify a floor in a multi-floor environment and thus limit the areas of correlation of radio frequency fingerprints.

The present disclosure includes a non-transitory computer storage medium storing instructions configured to instruct a computing apparatus to perform various methods discussed above and computing apparatuses having at least: a motion sensor; at least one transceiver; at least one microprocessor; and a memory storing instructions configured to instruct the at least one microprocessor and the at least one transceiver to perform any of the methods.

The systems and methods discussed above use fewer beacons to be deployed, relative to a solution not employing this method, to achieve continuous, high-accuracy positioning results. Results of the systems and method are generally more accurate than the results of a radio frequency fingerprint-based location estimate or an inertial guidance location estimate.

Precise positioning (defined here as within 1-2 meters 90% of the time) has yet to be reliably achieved in the prior art. This level of accuracy consistently allows for a vastly improved user experience when navigating a large indoor space such as a shopping center. It allows more precise targeting of communications within the space. For example, assuming the consumer has opted in to receive such messages and/or promotions, with this level of consistent positioning fidelity, a retailer could send a communication or promotion to a specific consumer as she walked by the storefront of the retailer. Such real-time, highly-contextual messaging and promotion is more valuable to advertisers than is general or even "area-based" messaging.

Additionally, there is value for shopping center owners in understanding traffic flows within their centers, in order to 1) promote leasing efforts, and, 2) better understand both individual and aggregate shopper behavior (e.g., gaining a precise understanding of who goes where, and how long they spend in each location and in transit) to better merchandise store mix within the center. The solution as described should allow the precision necessary to acquire positioning data with a very small margin of error, unlike many other solutions.

Figure 4:
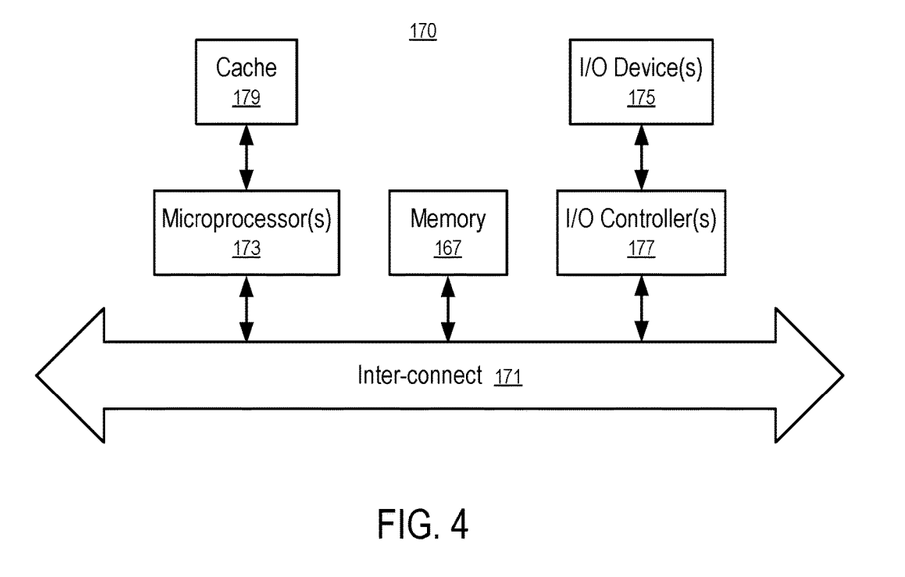
FIG. 4 illustrates a data processing system according to one embodiment.

FIG. 4 illustrates a data processing system according to one embodiment. For example, the data processing system of FIG. 4 can be used to implement each of the mobile device (101), the beacons (103, 105), the Wi-Fi Access Point (107), and/or a centralized remote service discussed above.

While FIG. 4 illustrates various components of a computer system, it is not intended to represent any particular architecture or manner of interconnecting the components. One embodiment may use other systems that have fewer or more components than those shown in FIG. 4.

In FIG. 4, the data processing system (170) includes an inter-connect (171) (e.g., bus and system core logic), which interconnects a microprocessor(s) (173) and memory (167). The microprocessor (173) is coupled to cache memory (179) in the example of FIG. 4.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others.

Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A non-transitory computer storage medium storing instructions configured to instruct a computing apparatus to perform a method, the method comprising:

measuring, by a mobile device, a radio frequency fingerprint;

correlating the radio frequency fingerprint to a predetermined distribution of radio frequency fingerprints in a multi-floor environment;

determining a first location determination result based on the correlating;

measuring, by the mobile device, accelerations of the mobile device as a function of time;

determining a second location determination result based on the accelerations;

receiving, in the mobile device, a first beacon signal from a beacon device disposed at a first location of a transport corridor in the multi-floor environment and a second beacon signal from the beacon device;

determining a first location of the beacon device based on the first beacon signal and a second location of the beacon device based on the second beacon signal; and computing a location of the mobile device based on the first location of the beacon device, the second location of the beacon device, the first location determination result, and the second location determination result.

2. The medium of claim 1, wherein the method further comprises:

determining a speed of the mobile device based on the first location and the second location of the beacon device;

wherein the second location determination result is determined based at least in part on the speed of the mobile device.

3. The medium of claim 2, wherein the transport corridor is one of: an escalator and an elevator.

4. The medium of claim 3, wherein the first beacon signal identifies the first location of the beacon device; and the second beacon signal identifies the second location of the beacon device.

5. The medium of claim 4, wherein the first location of the beacon device is used to select a floor in the first location determination result.

6. The medium of claim 1, wherein the method further comprises:

receiving, in the mobile device, a second beacon signal from a second beacon device;

determining a second location of the second beacon device based on the second beacon signal;

determining a speed of the mobile device based on the first location and the second location;

wherein the second location determination result is determined based at least in part on the speed of the mobile device.

7. A mobile device, comprising:

a motion sensor;

at least one transceiver;

at least one microprocessor; and a memory storing instructions configured to instruct the at least one microprocessor and the at least one transceiver to:

measure, using the at least one transceiver, a radio frequency fingerprint;

determine a first location determination result based on correlating the radio frequency fingerprint to a predetermined distribution of radio frequency fingerprints in a multi-floor environment;

measure, using the motion sensor, accelerations of the mobile device as a function of time;

determine a second location determination result based on the accelerations;

receive at least two beacon signals from at least one beacon device disposed on a transport corridor in a multi-floor environment;

determine at least two beacon locations corresponding to the at least two beacon signals; and compute a location of the mobile device based on the at least two beacon locations, the first location determination result, and the second location determination result.

8. The mobile device of claim 7, wherein the instructions are further configured to instruct the at least one microprocessor to:

estimate an accuracy of the first location result; and estimate an accuracy of the second location result;

wherein the combining of the first location determination result and the second location determination result is based on the accuracy of the first location result and the accuracy of the second location result.

9. The mobile device of claim 8, wherein the combining of the first location determination result and the second location determination result is based on a weighted average of the first location determination result and the second location determination result where weights of first location determination result and the second location determination result are based on the accuracy of the first location result and the accuracy of the second location result.

10. The mobile device of claim 7, wherein the instructions are further configured to instruct the at least one microprocessor to:

estimate a position and a speed of the mobile device on the transport corridor based on the at least two beacon locations;

wherein the location of the mobile device is computed based at least in part on the position and the speed of the mobile device on the transport corridor estimated based on the at least two beacon locations.

11. The mobile device of claim 10, wherein the second location determination result is based on the position and the speed of the mobile device on the transport corridor estimated based on the at least two beacon locations; and a floor in the first location determination result is determined based on the position of the mobile device on the transport corridor estimated based on the at least two beacon locations.

* * * * *